(12) United States Patent
Li et al.

(10) Patent No.: US 12,706,405 B2
(45) Date of Patent: Aug. 11, 2026

(54) I/O DEVICE CONNECTOR WITH INTERNAL CABLE CONNECTIONS

(71) Applicant: Intel Corporation, Santa Clara, CA (US)

(72) Inventors: Xiang Li, Portland, OR (US); Anthony M. Constantine, Portland, OR (US); Jingbo Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 17/524,565

(22) Filed: Nov. 11, 2021

(65) Prior Publication Data

US 2022/0069497 A1 Mar. 3, 2022

(51) Int. Cl.
*H01R 12/72* (2011.01)
*H01R 12/53* (2011.01)
(Continued)

(52) U.S. Cl.
CPC .......... *H01R 12/724* (2013.01); *H01R 12/53* (2013.01); *H01R 12/727* (2013.01); *G06F 13/40* (2013.01); *G06F 13/4004* (2013.01); *G06F 13/4027* (2013.01); *G06F 13/4045* (2013.01); *G06F 13/409* (2013.01); *G06F 13/42* (2013.01); *G06F 13/4221* (2013.01); *G06F 13/4234* (2013.01);
(Continued)

(58) Field of Classification Search
CPC .... H01R 12/724; H01R 12/53; H01R 12/727; H01R 12/51; H01R 12/59; H01R 12/592; H01R 12/594; H01R 12/596; H01R 12/71; H01R 12/72; H01R 12/722; H01R 12/725; H01R 12/73; H01R 12/735; H01R 12/737; H01R 13/646; H01R 13/6461; H01R 13/6463; G06F 13/40; G06F 13/4004; G06F 13/4027; G06F 13/4045; G06F 13/409; G06F 13/42; G06F 13/4221; G06F 13/4234; G06F 13/4265; G06F 13/4282; H01B 7/17
See application file for complete search history.

(56) References Cited

U.S. PATENT DOCUMENTS 3,237,146 A * 2/1966 Barker .............. H01R 13/6588 439/101
11,868,301 B1 * 1/2024 Frink .................. G06F 13/4022
(Continued)

FOREIGN PATENT DOCUMENTS

WO 2018176181 A1 10/2018

OTHER PUBLICATIONS

Extended European Search Report in EP Application Serial No. 22199520.2 mailed on Mar. 14, 2023 (11 pages).
(Continued)

*Primary Examiner* — Justin M Kratt
(74) *Attorney, Agent, or Firm* — Alliance IP, LLC

(57) ABSTRACT

An apparatus includes a rigid housing, a first connector coupled to the housing, the first connector to receive an edge connector of an input/output (I/O) device, and a second connector coupled to the housing, the second connector to couple to an edge connector socket. Pairs of electrical connection pins of the first connector are coupled to respective pairs of electrical connection pins of the second connector via shielded differential cables inside the housing.

20 Claims, 14 Drawing Sheets

(51) Int. Cl.

| | |
|---|---|
| *G06F 13/40* | (2006.01) |
| *G06F 13/42* | (2006.01) |
| *H01B 7/17* | (2006.01) |
| *H01R 12/51* | (2011.01) |
| *H01R 12/59* | (2011.01) |
| *H01R 12/71* | (2011.01) |
| *H01R 12/73* | (2011.01) |
| *H01R 13/646* | (2011.01) |
| *H01R 13/6461* | (2011.01) |
| *H01R 13/6463* | (2011.01) |

(52) U.S. Cl.

CPC ...... *G06F 13/4265* (2013.01); *G06F 13/4282* (2013.01); *H01B 7/17* (2013.01); *H01R 12/51* (2013.01); *H01R 12/59* (2013.01); *H01R 12/592* (2013.01); *H01R 12/594* (2013.01); *H01R 12/596* (2013.01); *H01R 12/71* (2013.01); *H01R 12/72* (2013.01); *H01R 12/722* (2013.01); *H01R 12/725* (2013.01); *H01R 12/73* (2013.01); *H01R 12/735* (2013.01); *H01R 12/737* (2013.01); *H01R 13/646* (2013.01); *H01R 13/6461* (2013.01); *H01R 13/6463* (2013.01)

(56) References Cited

U.S. PATENT DOCUMENTS

| | | | | |
|---|---|---|---|---|
| 2010/0048058 | A1 | 2/2010 | Morgan et al. | |
| 2015/0236451 | A1* | 8/2015 | Cartier, Jr. ........... | H01R 12/724 439/607.05 |
| 2015/0347345 | A1 | 12/2015 | Hellriegel et al. | |

OTHER PUBLICATIONS

EPO; Office Action issued in EP Application Serial No. 22199520.2, dated Jul. 17, 2024; 5 pages.

* cited by examiner

100
SoC 102
Motherboard 104
105
106
Connector 108
I/O Device 110

200
202A
202B
202C
202D
204D
Ln > L1
L1

64 Gbps Data rate

I/O DEVICE CONNECTOR WITH INTERNAL CABLE CONNECTIONS

FIELD

This disclosure pertains to computing systems, and in particular (but not exclusively) to input/output (I/O) device connectors with internal cable connections.

BACKGROUND

High bandwidth input/output (I/O) requirements drive increases in the number of high-speed I/O lanes, which results in more pins on I/O connectors. Vertical I/O connectors (e.g., X4, X8, and X16 Peripheral Component Interconnect (PCI) Card Edge Mechanical (CEM) connectors) have electrical lines/traces between the connector pins of the same length. However, non-vertical (e.g., orthogonal) I/O connectors have different length lines/traces between the connectors pins as certain of the traces must traverse a longer distance versus others. As a result, electrical performance between the different lines/traces of the connector may vary, especially with wider connectors having more I/O lanes.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Higher bandwidth requirements are driving an increase in the number of high-speed lanes for I/O connectors, resulting in more pins on the I/O connectors, such as Peripheral Component Interconnect Express (PCIe) Card Edge Mechanical (CEM) connector (including x4, x8, and x16 PCIe CEM connectors). Vertical I/O card connectors may have the same pin lengths across the connector, so increasing the number of lanes makes little difference on the connector's electrical performance (since the comparative lengths of the lines/traces of the connector do not change as the number of lanes increases).

However, some implementations call for non-vertical (e.g., orthogonal) I/O connectors, which may have different length lines/traces between the connectors pins as certain of the traces must traverse a longer distance versus others. As a result, electrical performance between the different lines/traces of the connector may vary, especially with wider connectors having more I/O lanes.

Figures 1, 2:
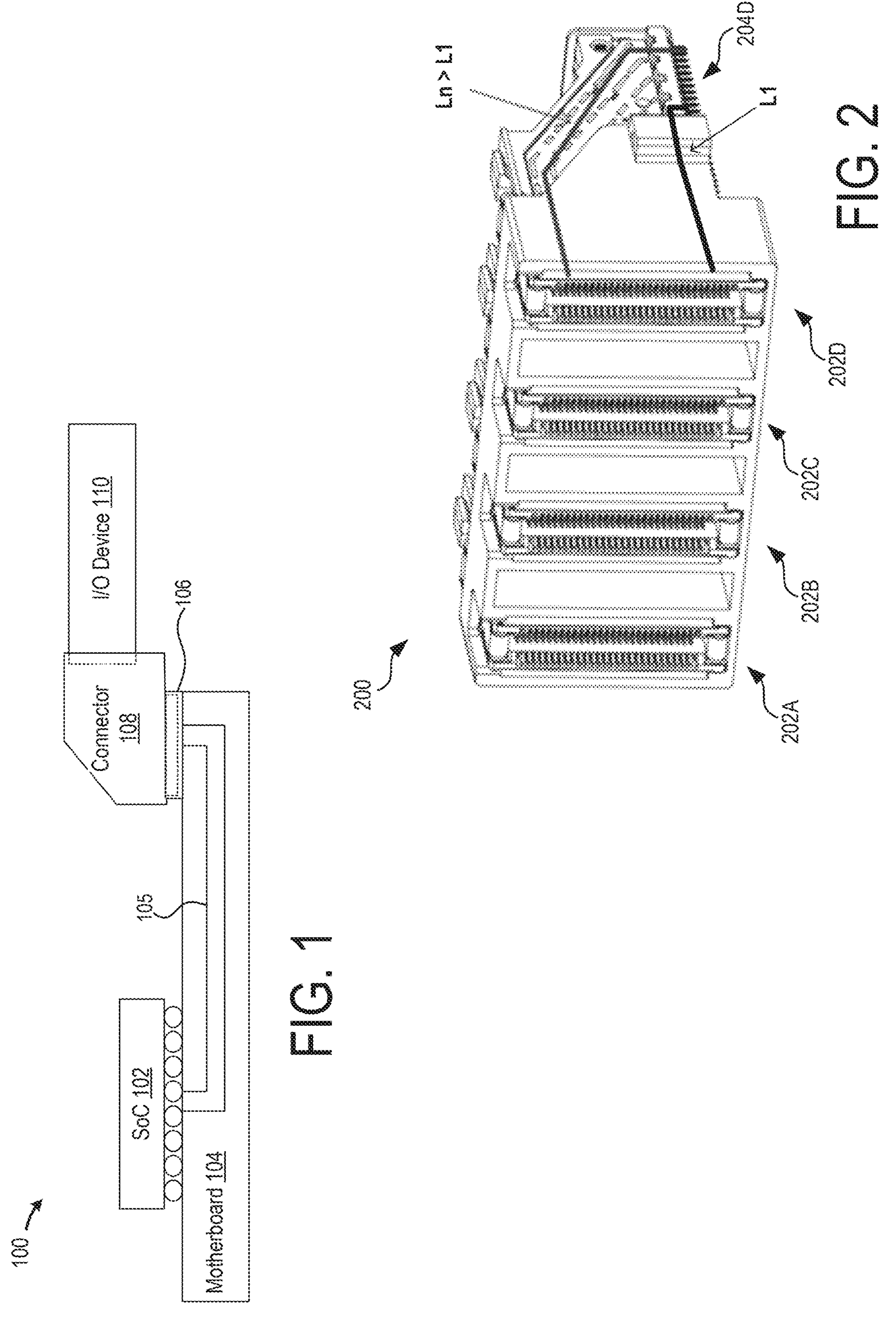
FIG. 1 illustrates an example system that includes an input/output (I/O) connector in accordance with embodiments of the present disclosure.
FIG. 2 illustrates a perspective view of an example input/output (I/O) connector in accordance with embodiments of the present disclosure.

FIG. 1 illustrates an example system 100 that includes an input/output (I/O) connector 108 in accordance with embodiments of the present disclosure. The example system 100 includes a system-on-chip (SoC) 102 coupled to a motherboard 104, and also includes an I/O device 110 coupled to the motherboard 104 through the I/O connector 108. The I/O connector 108 connects to the motherboard 104 through an edge connector socket 106 on the motherboard. The motherboard 104 includes a trace 105 that connects the SoC 102 to the I/O device 110 through the edge connector socket 106 and I/O connector 108. The I/O device 110 includes an edge connector that inserts into the I/O connector 108 (e.g., into a socket of the connector configured similarly to the socket 106), and the I/O connector 108 connects to the edge connector socket 106 using an edge connector mechanism similar to the edge connector of the I/O device 110. In some instances, the edge connector/connector sockets may be PCIe-compatible edge connectors/connector sockets (e.g., x4, x8, or x16 PCIe connectors), which may be used by PCIe devices as well as Compute Express Link (CXL) devices.

The I/O connector 108 of the system 100 may be configured in a similar manner to any of the I/O connectors described herein. For example, the I/O connector 108 may include high speed cabling that connects each side of the I/O connector 108, i.e., the side that couples to the I/O device 110 and the side that couples to the edge connector socket 105. The high-speed cabling may be shielded differential cabling, and may include twinaxial cabling, coaxial cabling, twisted pair cabling, or any other suitable high speed cabling mechanism. The high-speed cabling of the I/O connector 108 may provide one or more benefits including improved electrical performance, over traditional I/O connectors that include direct pin-to-pin wiring, e.g., a "paddle card" connection mechanism that utilizes traces (of unequal length) on a printed circuit board (PCB) that is connected between each edge connector of the I/O device 108.

FIG. 2 illustrates a perspective view of an example input/output (I/O) connector 200 in accordance with embodiments of the present disclosure. The example I/O connector 200 includes four PCIe-compatible edge connector sockets 202A-D as well as four edge connectors, with each edge connector socket 202A-D corresponding to a respective edge connector (e.g., edge connector socket 202D corresponding to edge connector 204D). The example I/O connector 200 is an orthogonal connector, similar to the I/O connector 108 of FIG. 1.

An orthogonal connector such as the I/O connector 200 may provide benefits in a rack mounted server chassis, for example, where cards can be placed into bays within the system to provide better serviceability and more efficient cooling. However, there are a few challenges with orthogonal connectors. As one example, the orthogonal connector will have different pin lengths across the edge connectors. For instance, as shown in FIG. 2, the connection between the first connector pins toward the bottom portion of the I/O connector 200 (the shorter radius portion) may have a length L1 that is much shorter than the length Ln of the n-th connection between the connector pins at the top portion of the I/O connector 200 (the larger radius portion). As a result, some connections between pins may be extremely long, especially in wider connectors, which can result in different electrical performance across the connector for certain pins, e.g. worse loss, cross talk, impedance mis-match, etc. This mismatched electrical performance can limit the data rate, in some instances, to below what is needed to match a required bandwidth (e.g., a bandwidth required for high-speed memory devices).

Figure 3:
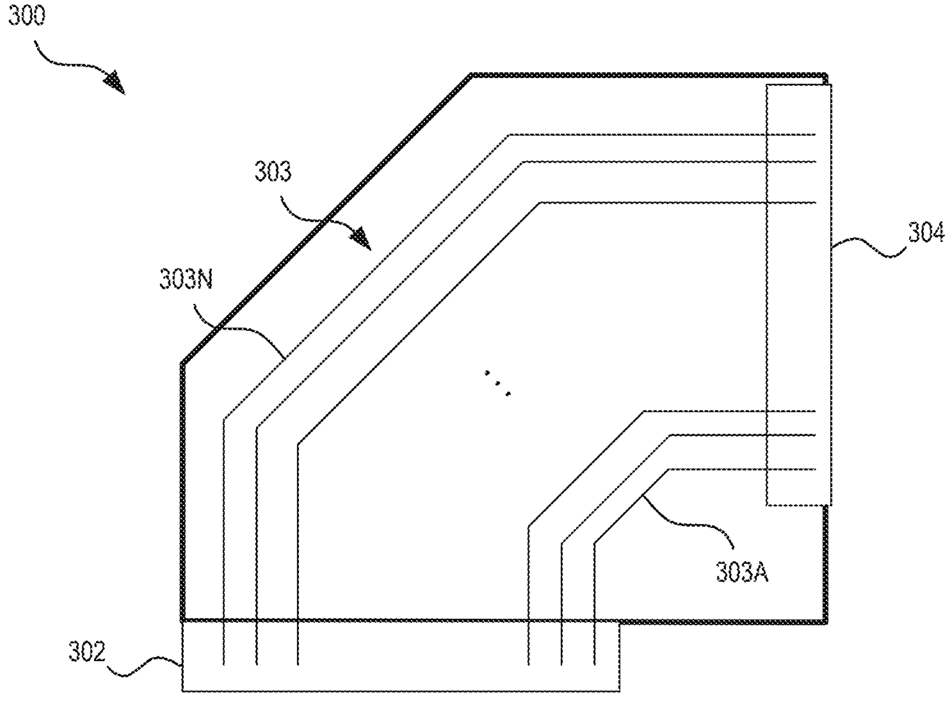
FIG. 3 illustrates an example orthogonal I/O connector with fixed lines between pins.

FIG. 3 illustrates an example orthogonal I/O connector 300 with fixed lines between pins. The example I/O connector 300 includes a first connector 302 and a second connector 304 connected by lines 303. The example I/O connector 300 may be implemented with direct pin connections, where each pins of the connectors 302, 304 is embedded in the housing of the connector 300 and connected via wires (303), or may be implemented with a paddle card connection, where both connectors 302, 304 have a straddle-mounted connector soldered onto a middle paddle card, which includes a PCB with traces (303) connecting the pins of the connectors 302, 304. As shown, the length of the line 303N is much longer than that of line 303A, and accordingly, has much worse electrical performance as described above. In addition, connectors with direct pins connections may be difficult to manufacture as more lanes are added, and every lane added makes the electrical performance for those added lanes worse. Moreover, crosstalk is another concern with these devices. Furthermore, connectors with paddle card connections use a PCB for interconnecting the connector pins, and each connector transition may result in larger loss. The PCB may also be lossy at high-speed data rates.

Another challenge is that CXL-based memory devices may require a PCIe-compatible x8 connector to meet the current generation (DDR5) memory bandwidth. The larger x8 connector will make the pin lengths longer than the x4 connector, which will further degrade electrical performance and further limit the bandwidth.

Figure 4:
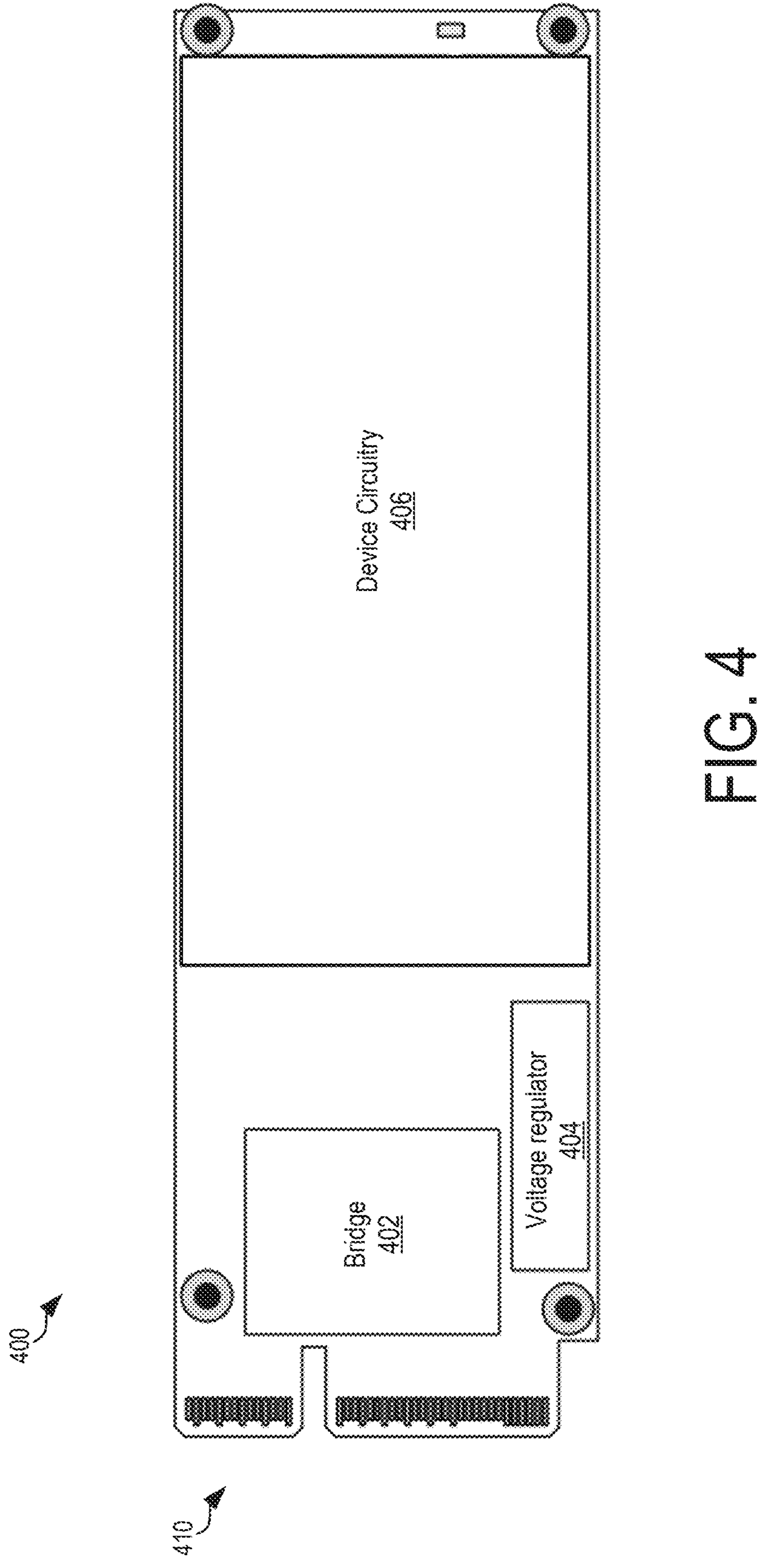
FIG. 4 illustrates an example I/O device in accordance with embodiments of the present disclosure.

FIG. 4 illustrates an example I/O device 400 in accordance with embodiments of the present disclosure. The example I/O device 400 includes bridge circuitry 402, voltage regulator circuitry 404, device circuitry 406, and an edge connector 410 for coupling the I/O device 400 to an edge connector socket (e.g., one of the sockets 202A-D of the I/O device 200 of FIG. 2). In the example shown, the edge connector 410 is a PCIe-compatible x8 connector.

In some embodiments, the I/O device 400 may be a CXL-based memory device that includes volatile memory (e.g., dynamic random-access memory (DRAM) modules) or non-volatile memory as part of the device circuitry 406. Through the use of a connector in accordance with the present disclosure, the CXL interface may be able to match the bandwidth required by DRAM modules. The bridge circuitry 402 may convert a native interface for the device circuitry 406 to the I/O interface. For example, the bridge circuitry 402 may convert a native memory interface to CXL and/or additional circuitry to support the memory or bridge.

Figure 5A:
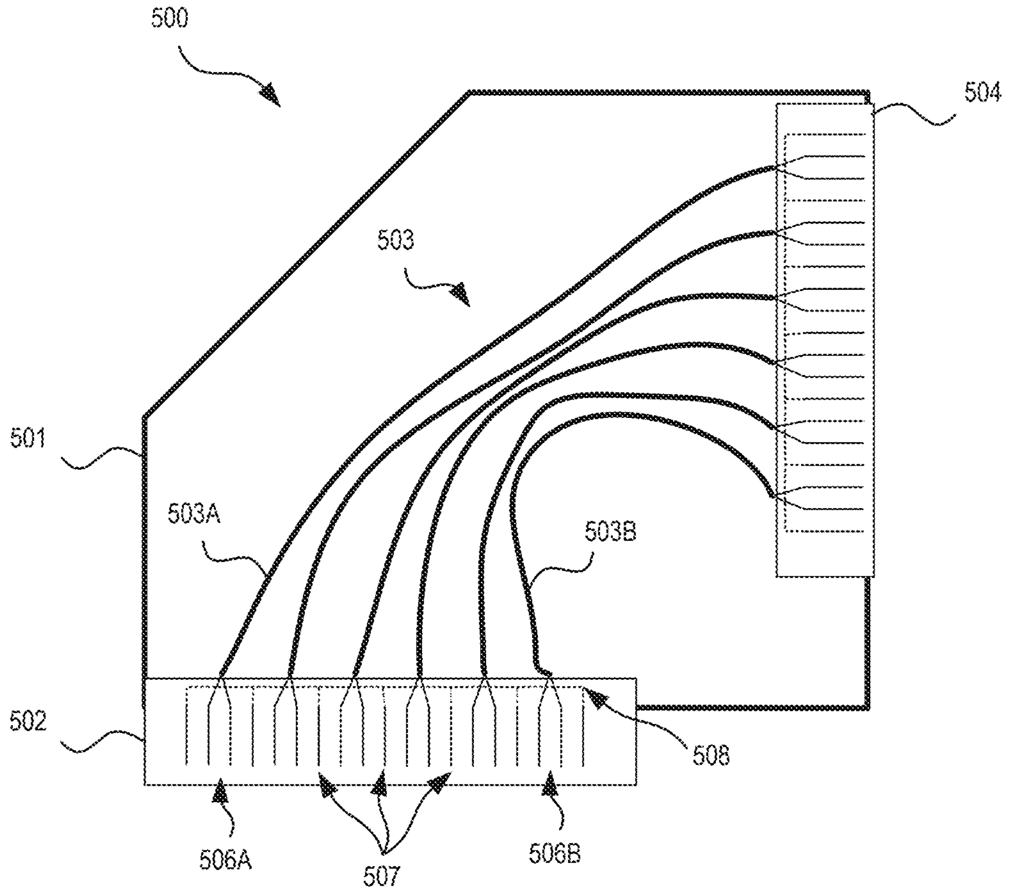
FIGS. 5A-5C illustrate example I/O connectors with internal cable connections between pins in accordance with embodiments of the present disclosure.
Figure 5B:
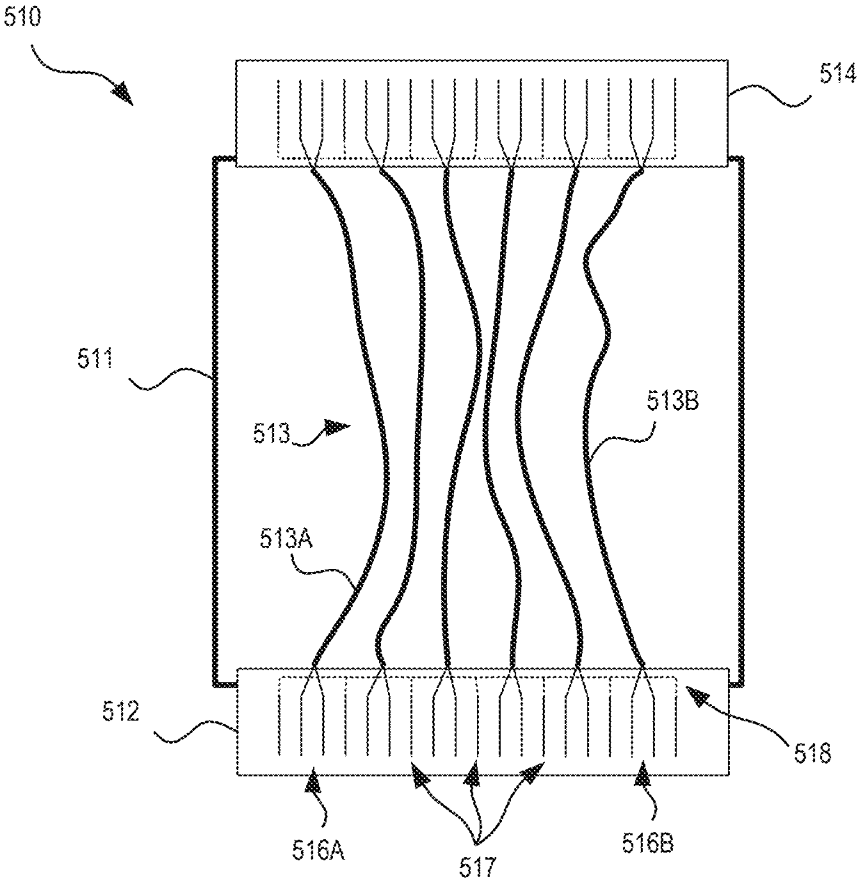

FIGS. 5A-5B illustrate example I/O connectors 500, 510 with internal cable connections between pins in accordance with embodiments of the present disclosure. The example connector 500 is orthogonal I/O connector, while the example connector 510 is a vertical connector. In each example, the I/O connector includes a first connector 502, 512 and a second connector 504, 514 coupled to a rigid housing 501, 511. In the example shown, the first connector 502, 512 is an edge connector to connect the I/O device to an edge connector socket of a motherboard, while the second connector 504, 514 is an edge connector socket to receive an edge connector of an I/O device.

In the examples shown, the signal pins (e.g., 506A, 506B, 516A, 516B) of the first and second connectors of the I/O devices 500, 510 are connected together via high-speed shielded differential cables 503 (e.g., 503A, 503B), 513 (e.g., 513A, 513B)—that is, pairs of pins of the first connector are connected with respective pairs of pins of the second connector through the high-speed cables 503, 513. The high-speed cables may be twinaxial, coaxial, twisted pair, or another type of high-speed different cable. In certain embodiments, the high-speed cables 503, 513 may be directly soldered onto the high speed differential pins 506, 516. In addition, the I/O connectors 500, 510 also include a ground bar (e.g., 508, 518) in each of the connectors 502, 512, 504, 514 to connect the ground pins (e.g., 507, 517) together, and in certain instances, also connect to the ground shield layer of the cables 503, 513 to provide a common ground.

High-speed cables have much lower loss, better impedance control, and less crosstalk than traces on a PCB, so the I/O connectors 500, 510 will have much better SI performance than the connector 300 of FIG. 3. In addition, since the high-speed cables are fully shielded, there will be little to no crosstalk inside the housing 501, 511. Thus, the whole connector may see significant crosstalk reduction, compared to a traditional orthogonal connector. The lower crosstalk and less insertion loss seen on a connector such as 500, 510 can be used to extend motherboard routing or PCB layer count reduction or cheaper PCB material, which will drive the system performance improvement and costs down.

Table 1 below shows a loss comparison between PCB and high-speed cables, such as the ones that would be incorporated into embodiments of the present disclosure. In particular, Table 1 shows a comparison of losses in dB/inch for a 30 AWG twinaxial or coaxial cable against medium loss (ML) and low loss (LL) stripline and ML/LL microstrip lines for a 16 GHz signal. As shown, the 30 AWG cable only has 10% of the loss of LL PCB microstrip. Thus, a connector with a ~3 inch length will save ~5.4 dB in the whole channel for a PCIe Gen5 implementation.

TABLE 1

| | | | |
|---|---|---|---|
| PCB | ML | Stripline | ~2.1 dB/inch |
| | | Microstrip | ~2.3 dB/inch |
| | LL | Stripline | ~1.5 dB/inch |
| | | Microstrip | ~2.0 dB/inch |
| Cable | 30AWG | Twinax/ucoax | ~0.2 dB/inch |

Although example orthogonal and vertical connectors are shown in FIGS. 5A-5B, it will be understood that connectors in accordance with embodiments herein can be oriented at any suitable angle. Further, although the examples shown in FIGS. 5A-5B have all differential pairs connected together via the high-speed cabling means (e.g., twinaxial or coaxial cables), in some embodiments, a connector may have only a subset of the differential pairs connected via such means. For example, a connector may include a first subset connected through the high-speed cabling for longer lines in the connector and traditional wiring (e.g., PCB strip lines or integrated wires) for shorter lines in the connector.

Figure 5C:
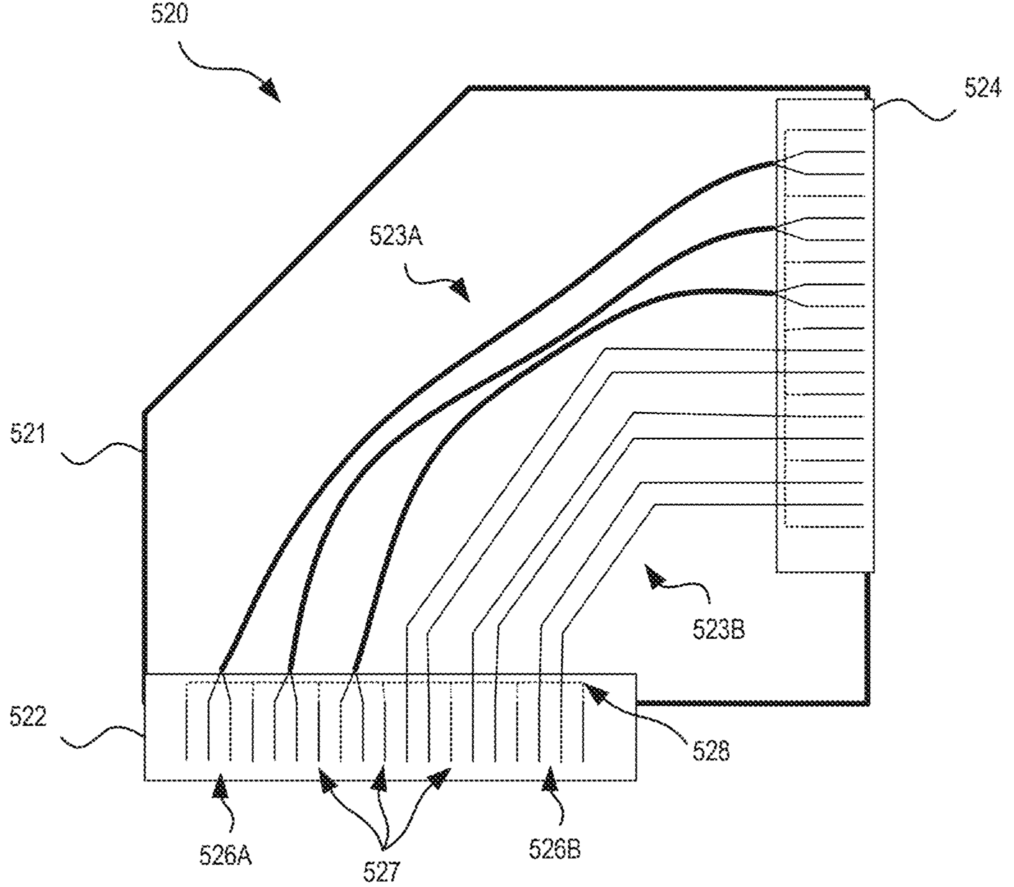

FIG. 5C illustrates an example I/O connector 520 with internal cable connections between a subset of pins in accordance with embodiments of the present disclosure. The example connector 520 includes a first connector 522 and a second connector 524 coupled to a rigid housing 521. In the example shown, the first connector 522 is an edge connector to connect the I/O device to an edge connector socket of a motherboard, while the second connector 524 is an edge connector socket to receive an edge connector of an I/O device. In the example shown, a first subset of signal pins (e.g., 526A) of the first and second connectors are connected together via high-speed shielded differential cables 523A as above, while a second subset of signal pins (e.g., 526B) of the first and second connectors are connected together via PCB stripline wiring 523B (e.g., as in FIG. 3). The high-speed cables may be twinaxial, coaxial, twisted pair, or another type of high-speed different cable. As before, the I/O connector 520 also includes a ground bar (e.g., 528) in each of the connectors 522, 524 to connect the ground pins (e.g., 527) together to provide a common ground.

Figure 6A:
FIGS. 6A-6B illustrate example simulation results for an I/O connector in accordance with embodiments of the present disclosure as compared with a current I/O connector design.
Figure 6A:
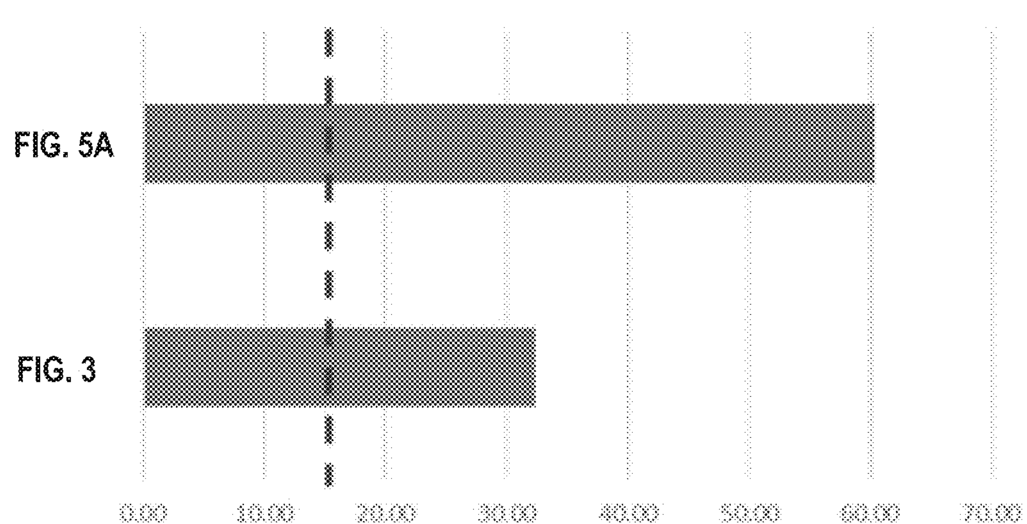
Figure 6A:
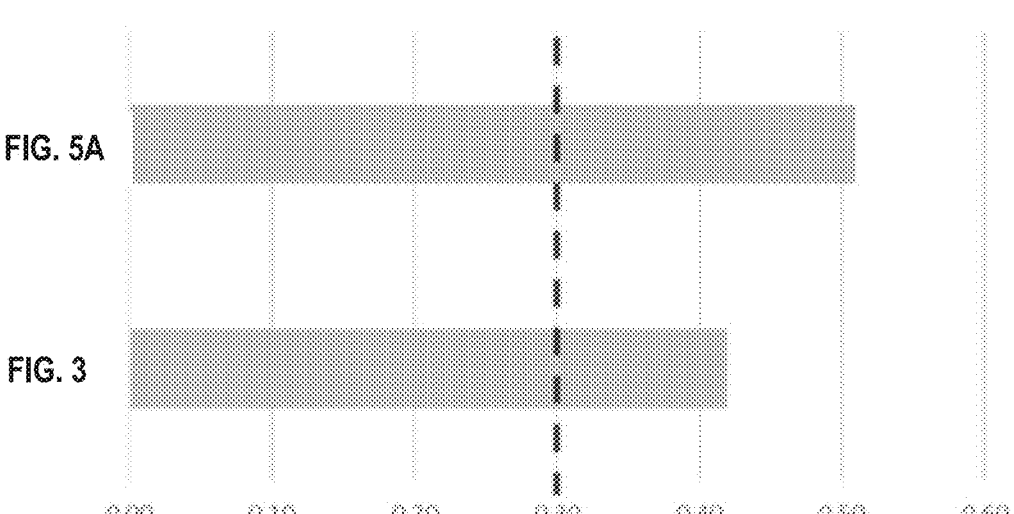
Figure 6B:
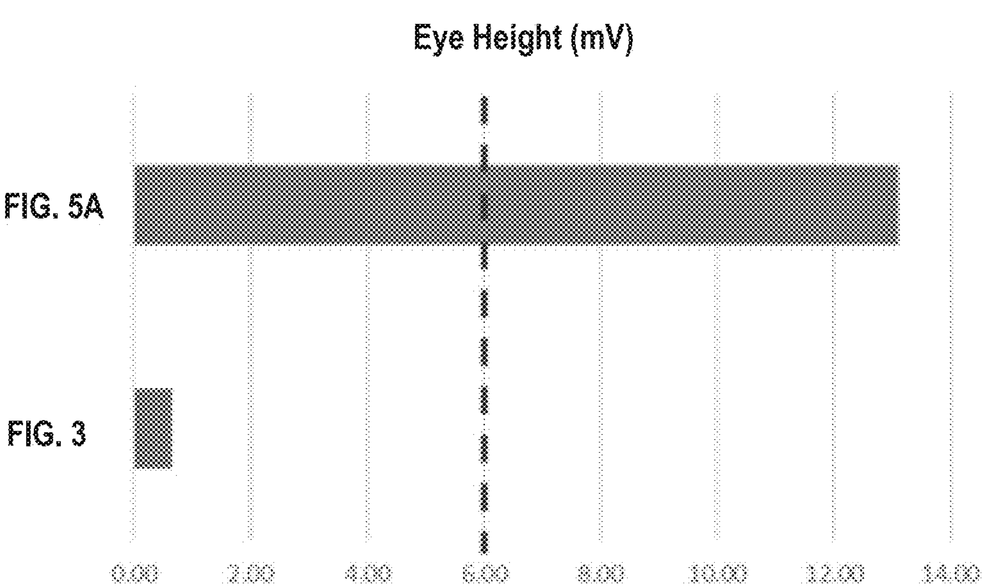
Figure 6B:
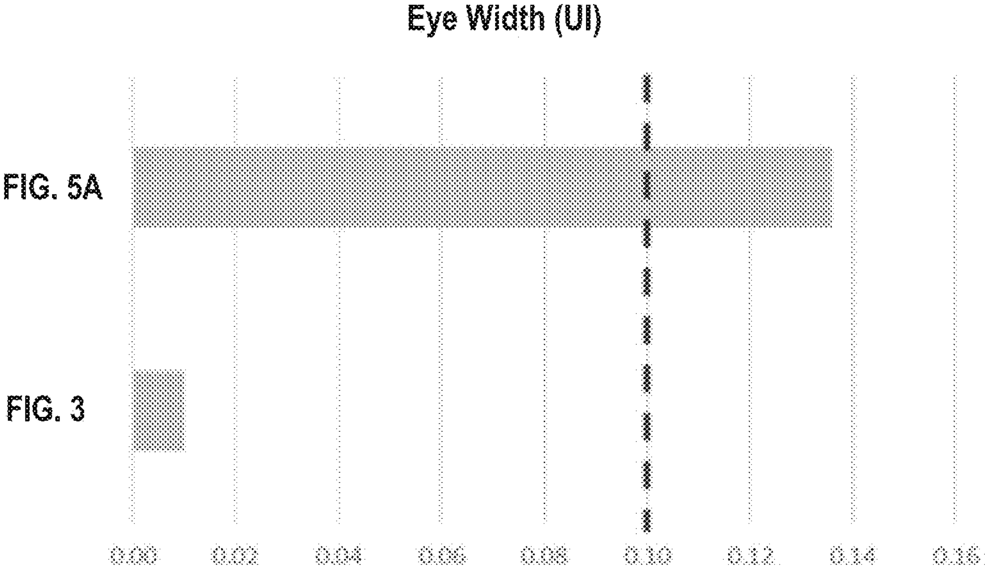

FIGS. 6A-6B illustrate example simulation results for an I/O connector in accordance with embodiments of the present disclosure as compared with a current I/O connector design. In particular, FIG. 6A illustrates link simulation results for a CXL 2.0 connection speed of 32 Gbps, and FIG. 6B illustrates link simulation results for a PCIe 6.0 connection speed of 64 Gbps with PAM4 signaling. The vertical dashed red lines in each of FIGS. 6A, 6B represent the eye mask requirements at the respective data rates. The link simulation is for a topology similar to the one shown in FIG. 1, with a 10 inch motherboard trace and a 2 inch I/O device board trace, with the "FIG. 3" bars representing a connector design similar to the connector 300 of FIG. 3 having a pedal card containing 2.5 inch low loss microstrip line and the "FIG. 5A" bars representing a connector design similar the connector 500 of FIG. 5A, having shielded 2.5 inch AWG 30 cables between the connectors as described above. The full link simulation was performed for both scenarios at CXL 2.0 speed (32 Gbps), shown in FIG. 6A, and at PCIe 6.0 speed (64 Gbps, PAM4 signaling), shown in FIG. 6B.

As shown in FIG. 6A, at 32 Gbps, using the high-speed cabling significantly improves the link performance by ~28 mV in eye height and ~0.1 UI in eye width. This improvement comes at least from: 1) the loss advantage of using internal cabling, and 2) the crosstalk advantage of a well-shielded cable. With the pedal card simulation, the full channel loss is about 25.1 dB @16 GHz., while with the AWG30 cable simulation, the total loss is 21.3 dB, which is 3.9 dB less. At the CXL 2.0 speed (32 Gbps), the performance advantage of the connector with high-speed cabling as described herein may allow for longer channel reach or more choices on interconnect components.

As the data rate increases, the loss and crosstalk advantages become more and more beneficial. As shown in FIG. 6B, the eye size when the link is running at PCIe 6.0 speed (64 Gbps, PAM4) is much improved with the high-speed cabled connector as described herein. For instance, with the pedal card simulation, there is almost no open eye (EH<1 mV, EW<0.01 UI), while with the high-speed cable simulation, the eye height and eye width still be are able to meet the PCIe 6.0 requirements (i.e., eye height >6 mV, eye width >0.1 UI). Therefore, a connector with internal high-speed cabling as described herein may also provide scalability for the next generation(s) of CXL speeds.

Figure 7:
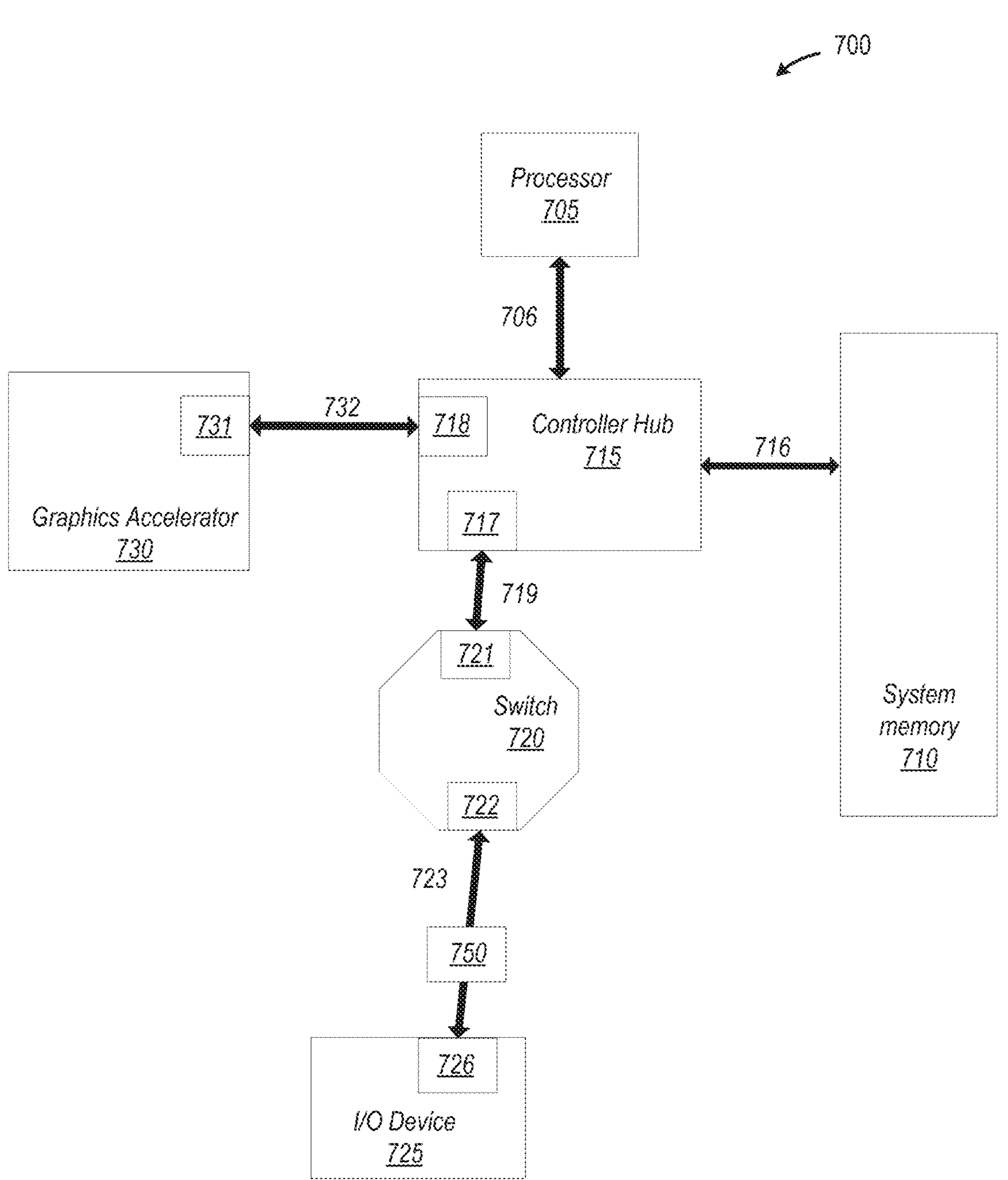
FIG. 7 illustrates an embodiment of a computing system including an interconnect architecture.

FIGS. 7-10 illustrate example interconnect embodiments in which aspects of the present disclosure may be incorporated. Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705. Further, one or more links (e.g., 723) of the system can include one or more extension devices (e.g., 750), such as retimers, repeaters, etc.

Figure 8:
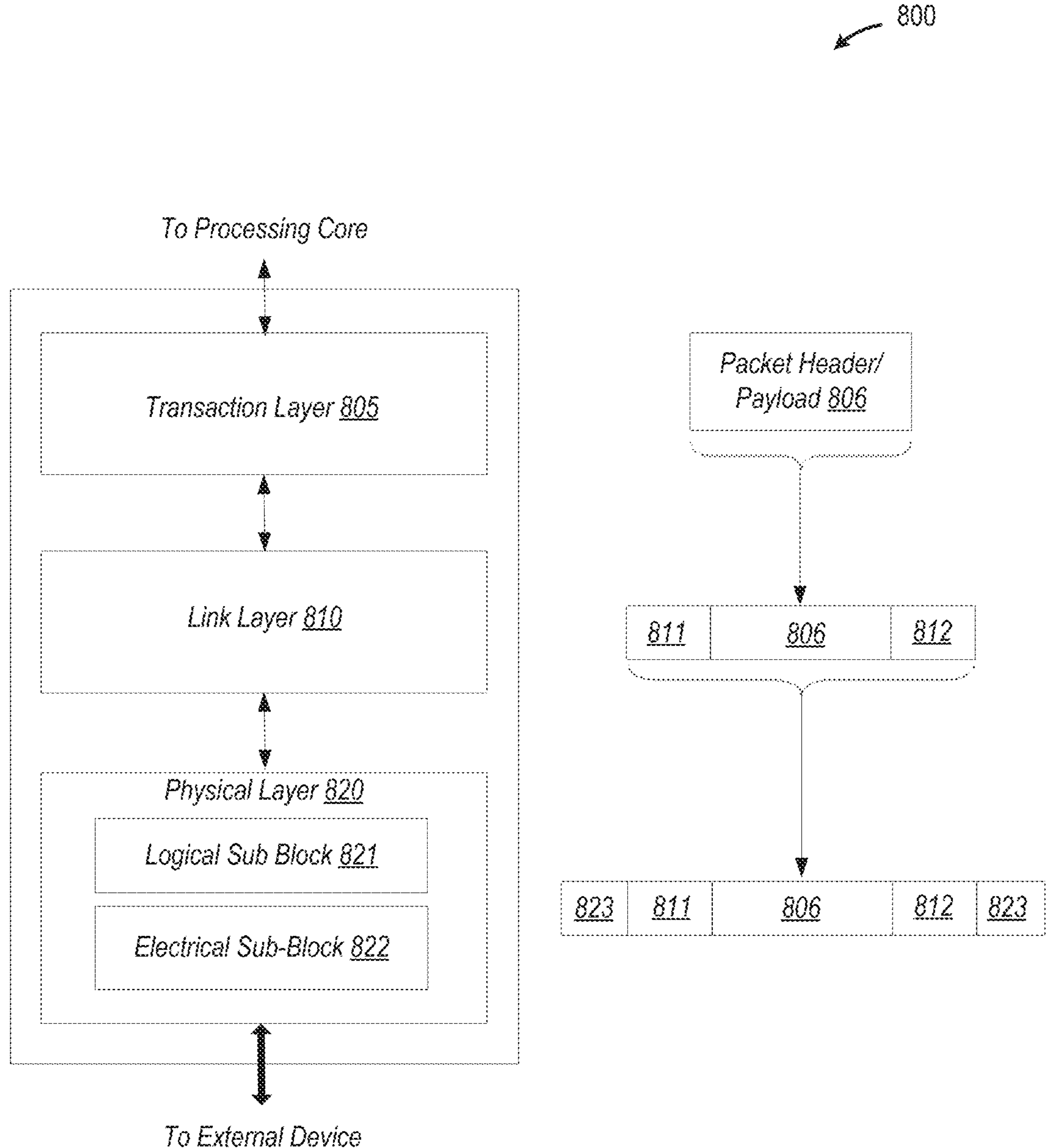
FIG. 8 illustrates an embodiment of an interconnect architecture including a layered stack.

Turning to FIG. 8 an embodiment of a layered protocol stack is illustrated. Layered protocol stack 800 includes any form of a layered communication stack, such as a Quick Path Interconnect (QPI) stack, a PCIe stack, a next generation high performance computing interconnect stack, or other layered stack. Although the discussion below relates to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8*b*/10*b* transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

A variety of other interconnect architectures and protocols may utilize the concepts discussed herein. In one example, Compute Express Link (CXL) may be used. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples).

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 9:
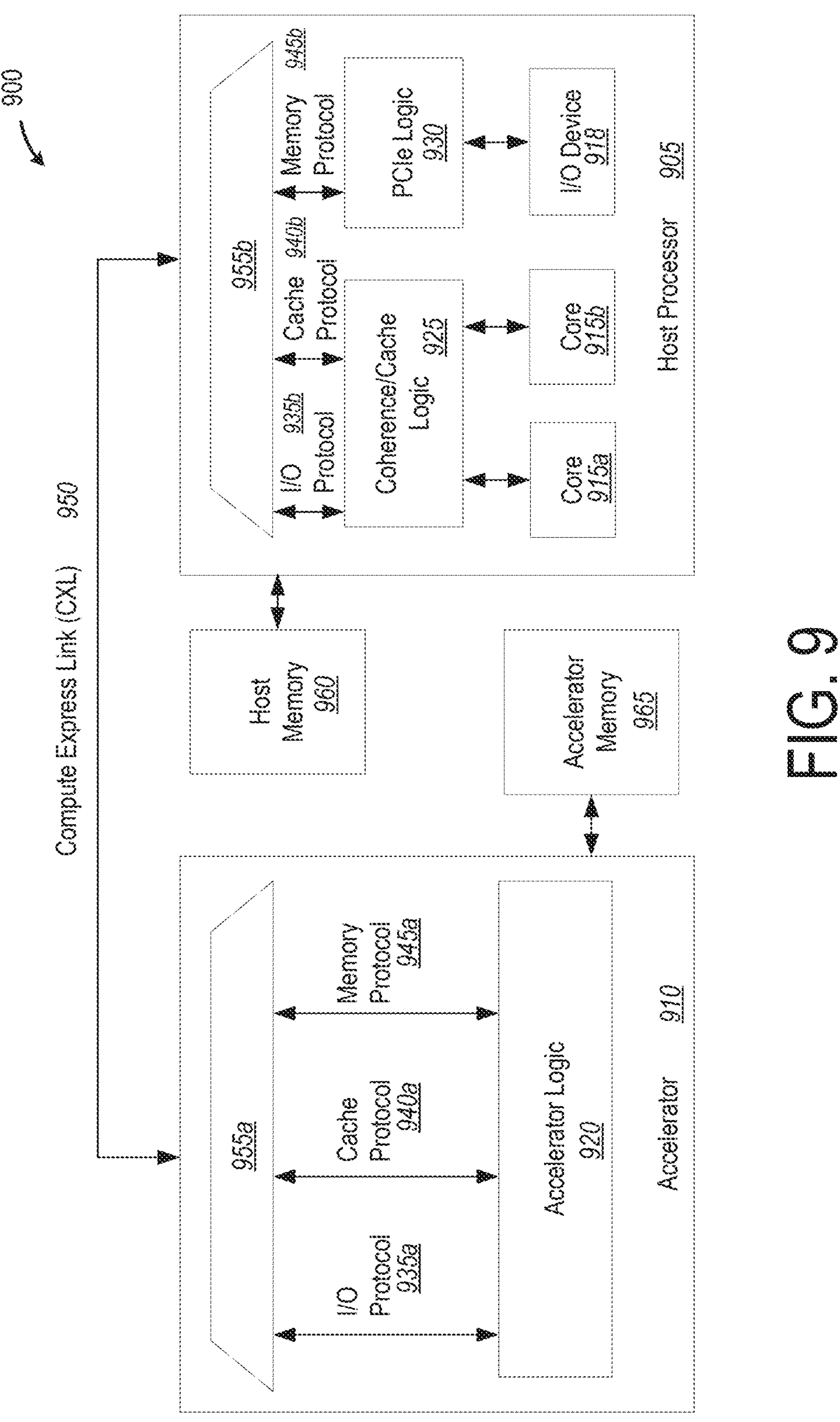
FIG. 9 illustrates a simplified block diagram is shown illustrating an example system utilizing a CXL link.

Turning to FIG. 9, a simplified block diagram 900 is shown illustrating an example system utilizing a CXL link 950. For instance, the link 950 may interconnect a host processor 905 (e.g., CPU) to an accelerator device 910. In this example, the host processor 905 includes one or more processor cores (e.g., 915*a-b*) and one or more I/O devices (e.g., 918). Host memory (e.g., 960) may be provided with the host processor (e.g., on the same package or die). The accelerator device 910 may include accelerator logic 920 and, in some implementations, may include its own memory (e.g., accelerator memory 965). In this example, the host processor 905 may include circuitry to implement coherence/cache logic 925 and interconnect logic (e.g., PCIe logic 930). CXL multiplexing logic (e.g., 955*a-b*) may also be provided to enable multiplexing of CXL protocols (e.g., I/O protocol 935*a-b* (e.g., CXL.io), caching protocol 940*a-b* (e.g., CXL.cache), and memory access protocol 945*a-b* (CXL.mem)), thereby enabling data of any one of the supported protocols (e.g., 935*a-b*, 940*a-b*, 945*a-b*) to be sent, in a multiplexed manner, over the link 950 between host processor 905 and accelerator device 910.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 10:
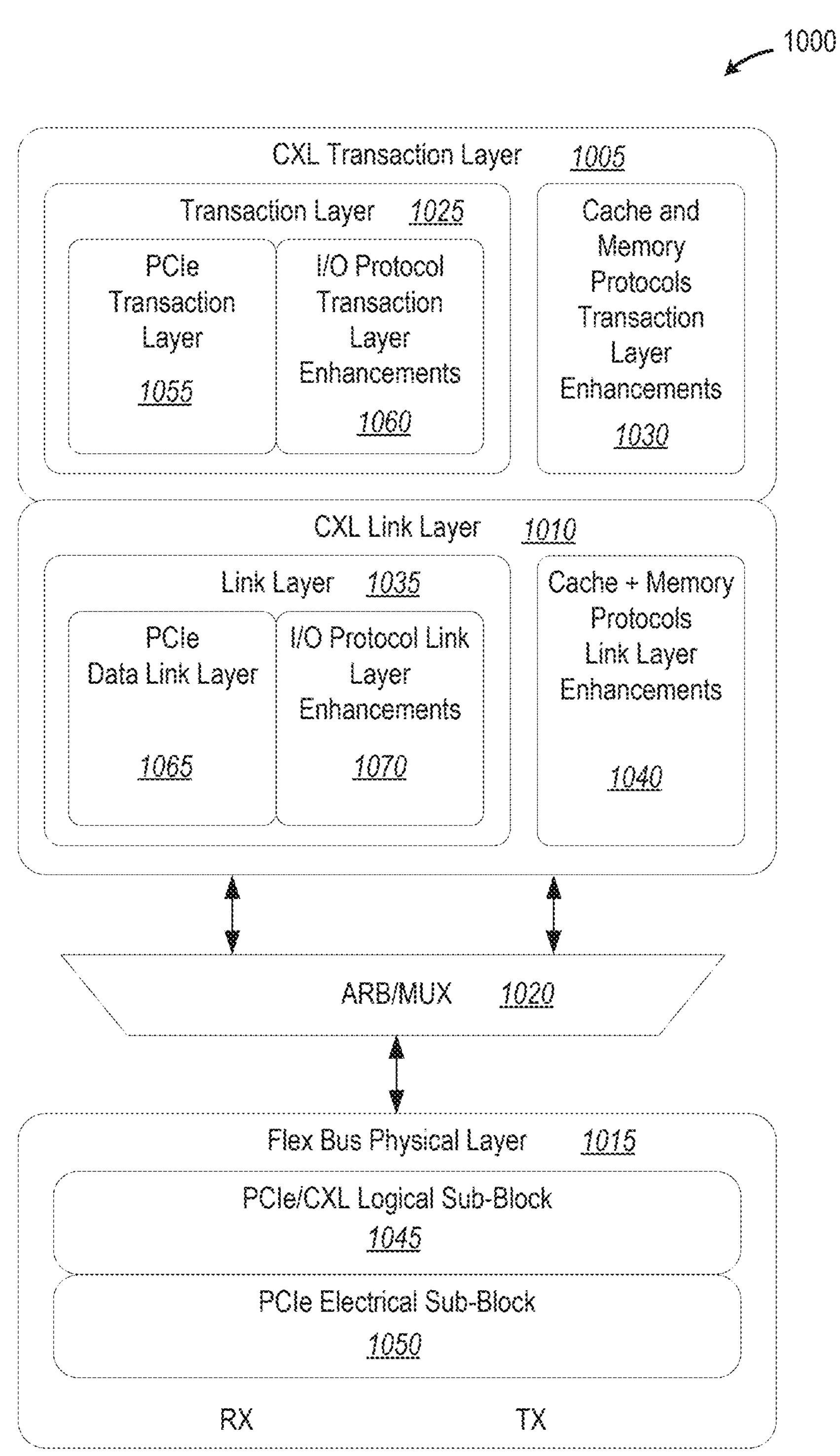
FIG. 10 illustrates a simplified block diagram illustrating an example port architecture utilized to implement CXL links.

FIG. 10 illustrates a simplified block diagram illustrating an example port architecture 1000 (e.g., Flex Bus) utilized to implement CXL links. For instance, Flex Bus architecture may be organized as multiple layers to implement the multiple protocols supported by the port. For instance, the port may include transaction layer logic (e.g., 1005), link layer logic (e.g., 1010), and physical layer logic (e.g., 1015) (e.g., implemented all or in-part in circuitry). For instance, a transaction (or protocol) layer (e.g., 1005) may be subdivided into transaction layer logic 1025 that implements a PCIe transaction layer 1055 and CXL transaction layer enhancements 1060 (for CXL.io) of a base PCIe transaction layer 1055, and logic 1030 to implement cache (e.g., CXL.cache) and memory (e.g., CXL.mem) protocols for a CXL link. Similarly, link layer logic 1035 may be provided to implement a base PCIe data link layer 1065 and a CXL link layer (for CXl.io) representing an enhanced version of the PCIe data link layer 1065. A CXL link layer 1010 may also include cache and memory link layer enhancement logic 1040 (e.g., for CXL.cache and CXL.mem).

Continuing with the example of FIG. 10, a CXL link layer logic 1010 may interface with CXL arbitration/multiplexing (ARB/MUX) logic 1020, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 1015 based on a PCIe physical layer (e.g., PCIe electrical PHY 1050). For instance, a Flex Bus physical layer may be implemented as a converged logical physical layer 1045 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port 1000 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

Figure 11:
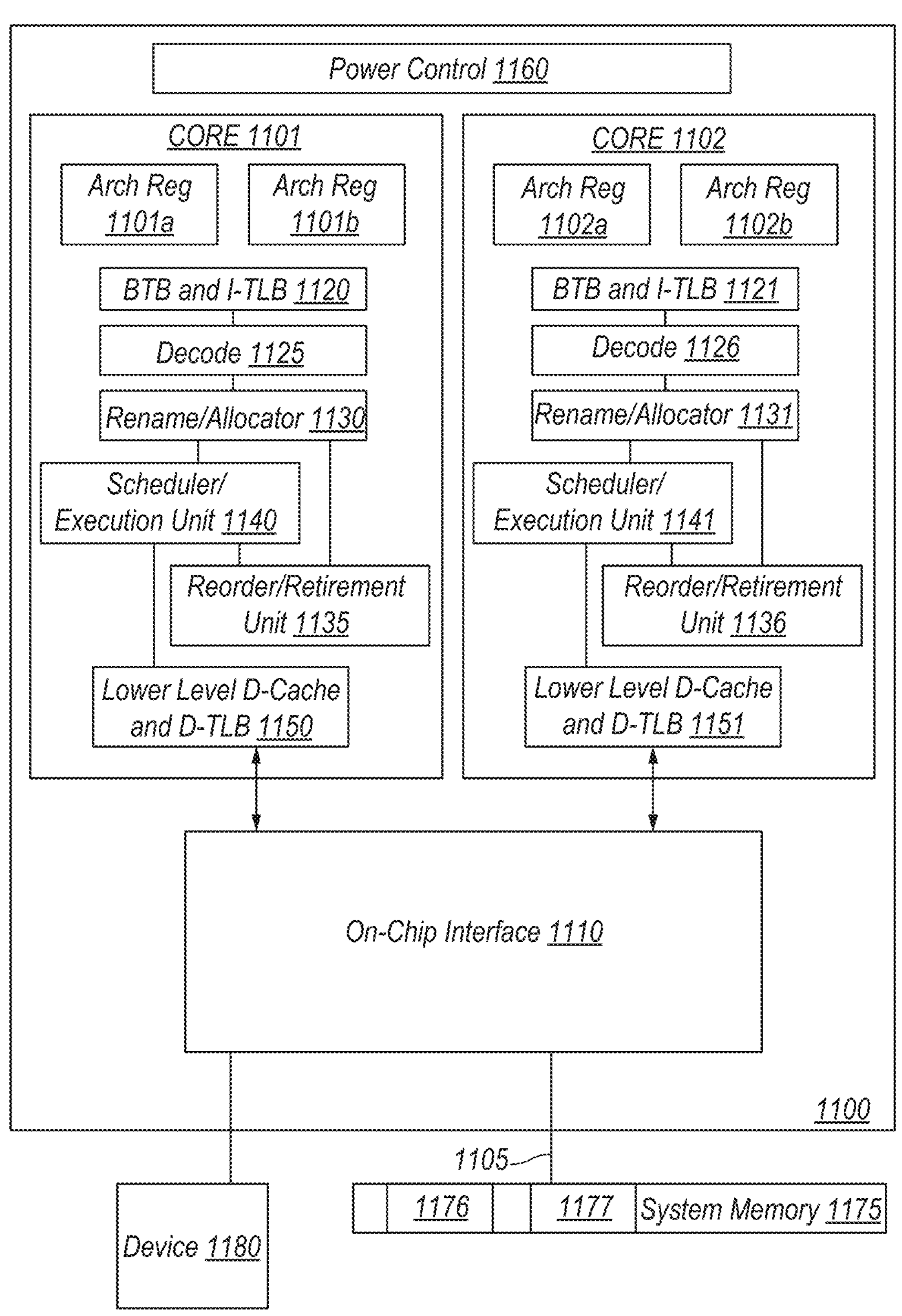
FIG. 11 illustrates an embodiment of a block diagram for a computing system including a multicore processor.
Figure 12:
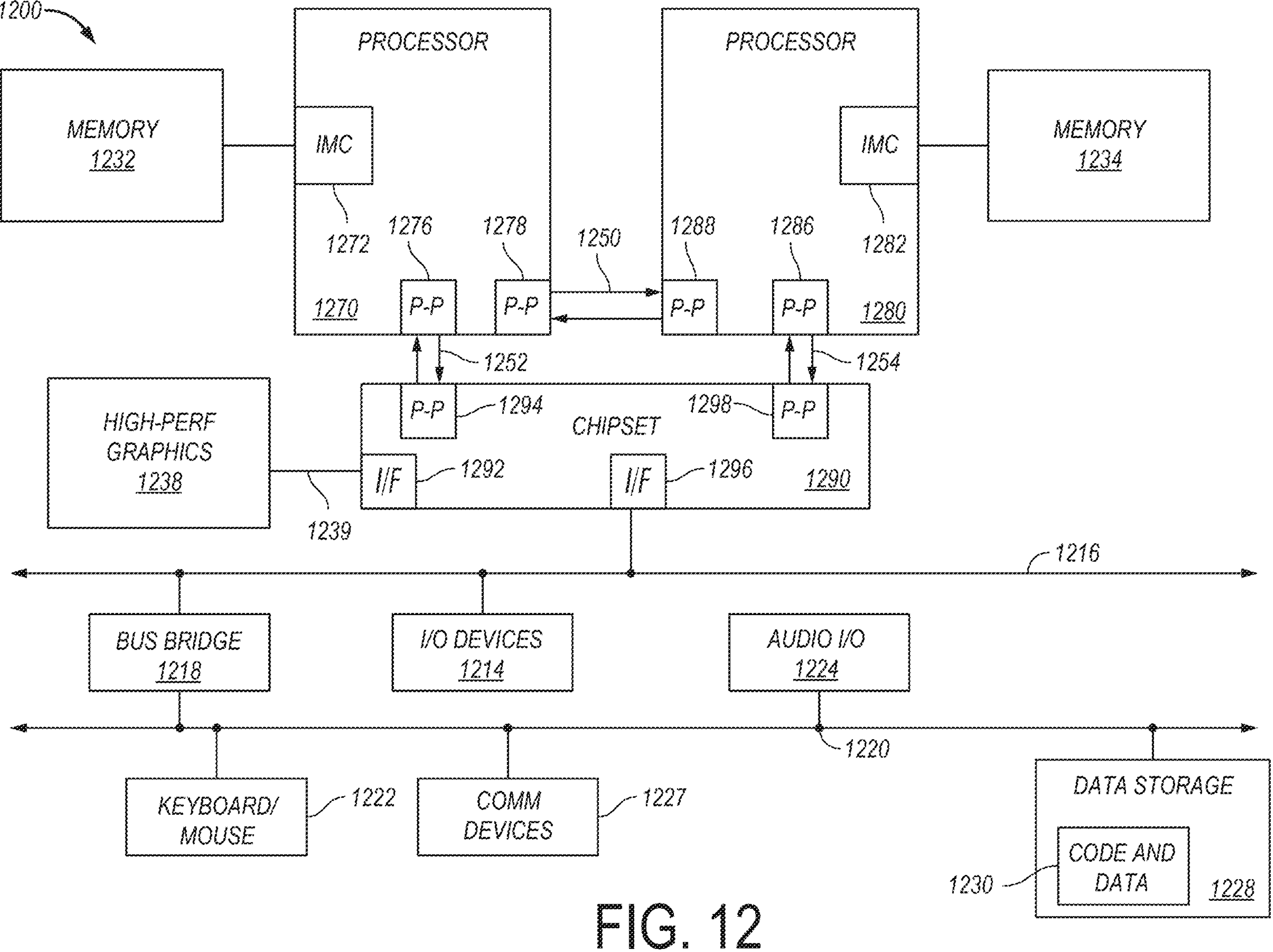
FIG. 12 illustrates an embodiment of a block for a computing system including multiple processors.

FIGS. 11-12 below provide some example computing devices/systems/environments and associated hardware that may be used in the context of embodiments as described herein.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores-core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores-core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache-a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Referring now to FIG. 12, shown is a block diagram of another system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as a high-performance architecture. As a result, certain embodiments may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

The foregoing disclosure has presented a number of example mechanisms for delivering power to PCIe add-in cards through additional edge finger tabs. It should be appreciated that other mechanisms may be provided in addition to those identified above without departing from the more generalized principles contained within this disclosure. For instance, while some of the example power delivery mechanisms discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform certain embodiments may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification.

Example 1 includes an apparatus comprising: a rigid housing; a first connector coupled to the housing, the first connector to receive an edge connector of an input/output (I/O) device; and a second connector coupled to the housing, the second connector to couple to an edge connector socket; wherein pairs of electrical connection pins of the first connector are coupled to respective pairs of electrical connection pins of the second connector via shielded differential cables inside the housing.

Example 2 includes the subject matter of Example 1, wherein the shielded differential cables are twinaxial cables.

Example 3 includes the subject matter of Example 1, wherein the shielded differential cables are coaxial cables.

Example 4 includes the subject matter of Example 1, wherein shielded differential cables are twisted pair cables.

Example 5 includes the subject matter of any one of Examples 1-4, wherein the first and second connectors each comprise a ground bar coupling a set of electrical connection pins of the connectors other than the pairs connected to the shielded differential cables.

Example 6 includes the subject matter of Example 5, wherein the ground bar is connected to the shielding of each shielded differential cable inside the housing.

Example 7 includes the subject matter of any one of Examples 1-6, wherein the first connector housing is oriented orthogonally to the second connector housing.

Example 8 includes the subject matter of any one of Examples 1-7, wherein the first connector is to receive a Peripheral Component Interconnect Express (PCIe)-compatible I/O device, and the second connector is to couple to a PCIe-compatible edge connector socket.

Example 9 includes the subject matter of any one of Examples 1-8, further comprising: a fourth connector coupled to the housing, the fourth connector to receive an edge connector of an input/output (I/O) device; a fifth connector coupled to the housing, the fifth connector to couple to an edge connector socket; wherein pairs of electrical connection pins of the fourth connector are coupled to respective pairs of electrical connection pins of the fifth connector via shielded differential cables inside the housing.

Example 9.5 includes the subject matter of any one of Examples 1-9, wherein the apparatus comprises a first set of electrical connection pins of the first connector coupled to a first set of electrical connection pins of the second connector via shielded differential cables inside the housing, and a second set of electrical connection pins of the first connector coupled to a second set of electrical connection pins of the second connector via printed circuit board (PCB) stripline wiring.

Example 10 includes a system comprising: a motherboard; a system-on-chip (SoC) comprising a processor, the SoC coupled to the motherboard; an input/output (I/O) device connector coupled to the motherboard, the I/O device connector electrically coupled to the SoC through the motherboard, the I/O device connector comprising: a rigid housing; a first connector coupled to the housing, the first connector to receive an edge connector of an input/output (I/O) device; a second connector coupled to the housing, the second connector coupled to an edge connector socket of the motherboard; wherein pairs of electrical connection pins of the first connector are coupled to respective pairs of electrical connection pins of the second connector via shielded differential cables inside the housing.

Example 11 includes the subject matter of Example 10, wherein the shielded differential cables are twinaxial cables.

Example 12 includes the subject matter of Example 10, wherein the shielded differential cables are coaxial cables.

Example 13 includes the subject matter of Example 10, wherein shielded differential cables are twisted pair cables.

Example 14 includes the subject matter of any one of Examples 10-13, wherein the first and second connectors each comprise a ground bar coupling a set of electrical connection pins of the connectors other than the pairs connected to the shielded differential cables.

Example 15 includes the subject matter of any one of Examples 10-14, wherein the ground bar is connected to the shielding of each shielded differential cable inside the housing.

Example 16 includes the subject matter of any one of Examples 10-15, wherein the first connector housing is oriented orthogonally to the second connector housing.

Example 17 includes the subject matter of any one of Examples 10-16, wherein the first connector is to receive a Peripheral Component Interconnect Express (PCIe)-compatible I/O device, and the second connector is to couple to a PCIe-compatible edge connector socket.

Example 18 includes the subject matter of any one of Examples 10-17, further comprising an I/O device coupled to the first connector.

Example 19 includes the subject matter of Example 18, wherein the I/O device is a memory device.

Example 20 includes the subject matter of any one of Examples 10-19, wherein the first connector is to receive an edge connector of a first I/O device, the second connector is coupled to a first edge connector socket of the motherboard, and the I/O device connector further comprises: a fourth connector coupled to the housing, the fourth connector to receive an edge connector of a second I/O device; a fifth connector coupled to the housing, the fifth connector coupled to a second edge connector socket of the mother board; wherein pairs of electrical connection pins of the fourth connector are coupled to respective pairs of electrical connection pins of the fifth connector via shielded differential cables inside the housing.

Example 21 includes the subject matter of Example 20, further comprising a I/O device coupled to the fourth connector.

Example 22 includes an apparatus comprising: a rigid housing; a first connector coupled to the housing, the first connector to receive an edge connector of an input/output (I/O) device; a second connector coupled to the housing, the second connector to couple to an edge connector socket; and high-speed cabling means for connecting pairs of electrical connection pins of the first connector to respective pairs of electrical connection pins of the second connector.

Example 23 includes the subject matter of Example 22, wherein the first connector housing is oriented orthogonally to the second connector housing.

Example 24 includes the subject matter of Example 22 or 23, wherein the first connector is to receive a Peripheral Component Interconnect Express (PCIe)-compatible I/O device, and the second connector is to couple to a PCIe-compatible edge connector socket.

Example 25 includes the subject matter of any one of Examples 22-24, further comprising: a fourth connector coupled to the housing, the fourth connector to receive an edge connector of an input/output (I/O) device; a fifth connector coupled to the housing, the fifth connector to couple to an edge connector socket; high-speed cabling means for connecting pairs of electrical connection pins of the fourth connector to respective pairs of electrical connection pins of the fifth connector.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
- a rigid housing;
- a first connector coupled to the housing, the first connector to receive an edge connector of a Peripheral Component Interconnect Express (PCIe)-compatible input/output (I/O) device; and
- a second connector coupled to the housing, the second connector to insert into a PCIe-compatible edge connector socket;
- wherein pairs of electrical connection pins of the first connector are coupled to respective pairs of electrical connection pins of the second connector via shielded differential cables inside the housing and the first and second connectors each comprise a ground bar coupling a set of electrical connection pins of the connectors other than the pairs connected to the shielded differential cables.

2. The apparatus of claim 1, wherein the shielded differential cables are twinaxial cables.

3. The apparatus of claim 1, wherein the shielded differential cables are coaxial cables.

4. The apparatus of claim 1, wherein the shielded differential cables are twisted pair cables.

5. The apparatus of claim 1, wherein the ground bar is connected to the shielding of each shielded differential cable inside the housing.

6. The apparatus of claim 1, wherein the first connector housing is oriented orthogonally to the second connector housing.

7. The apparatus of claim 1, further comprising:
- a third connector coupled to the housing, the third connector to receive an edge connector of an input/output (I/O) device;
- a fourth connector coupled to the housing, the fourth connector to couple to an edge connector socket;
- wherein pairs of electrical connection pins of the third connector are coupled to respective pairs of electrical connection pins of the fourth connector via shielded differential cables inside the housing.

8. The apparatus of claim 1, wherein the apparatus comprises a first set of electrical connection pins of the first connector coupled to a first set of electrical connection pins of the second connector via shielded differential cables inside the housing, and a second set of electrical connection pins of the first connector coupled to a second set of electrical connection pins of the second connector via printed circuit board (PCB) stripline wiring.

9. A system comprising:
- a motherboard;
- a system-on-chip (SoC) comprising a processor, the SoC coupled to the motherboard;
- an input/output (I/O) device connector coupled to the motherboard, the I/O device connector electrically coupled to the SoC through the motherboard, the I/O device connector comprising:
  - a rigid housing;
  - a first connector coupled to the housing, the first connector to receive an edge connector of a Peripheral Component Interconnect Express (PCIe)-compatible input/output (I/O) device;
  - a second connector coupled to the housing, the second connector coupled to a PCIe-compatible edge connector socket on the motherboard;
  - wherein pairs of electrical connection pins of the first connector are coupled to respective pairs of electrical connection pins of the second connector via shielded differential cables inside the housing and the first and second connectors each comprise a ground bar coupling a set of electrical connection pins of the connectors other than the pairs connected to the shielded differential cables.

10. The system of claim 9, wherein the shielded differential cables are twinaxial cables.

11. The system of claim 9, wherein the shielded differential cables are coaxial cables.

12. The system of claim 9, wherein the shielded differential cables are twisted pair cables.

13. The system of claim 9, wherein the ground bar is connected to the shielding of each shielded differential cable inside the housing.

14. The system of claim 9, further comprising an I/O device coupled to the first connector.

15. The system of claim 14, wherein the I/O device is a memory device.

16. The system of claim 9, wherein the first connector is to receive an edge connector of a first I/O device, the second connector is coupled to a first edge connector socket of the motherboard, and the I/O device connector further comprises: a third connector coupled to the housing, the third connector to receive an edge connector of a second I/O device; a fourth connector coupled to the housing, the fourth connector coupled to a second edge connector socket of the motherboard; wherein pairs of electrical connection pins of the third connector are coupled to respective pairs of electrical connection pins of the fourth connector via shielded differential cables inside the housing.

17. The system of claim 16, further comprising an I/O device coupled to the fourth connector.

18. An apparatus comprising:
- a rigid housing;
- a first connector coupled to the housing, the first connector to receive an edge connector of a Peripheral Component Interconnect Express (PCIe)-compatible input/output (I/O) device;

a second connector coupled to the housing, the second connector to couple to insert into a PCIe-compatible edge connector socket; and high-speed cabling means for connecting pairs of electrical connection pins of the first connector to respective pairs of electrical connection pins of the second connector, wherein the first and second connectors each comprise a ground bar coupling a set of electrical connection pins of the connectors other than the pairs connected to the high-speed cabling means.

19. The apparatus of claim 18, wherein the first connector housing is oriented orthogonally to the second connector housing.

20. The apparatus of claim 18, further comprising:

a third connector coupled to the housing, the third connector to receive an edge connector of an input/output (I/O) device;

a fourth connector coupled to the housing, the fourth connector to couple to an edge connector socket;

high-speed cabling means for connecting pairs of electrical connection pins of the third connector to respective pairs of electrical connection pins of the fourth connector.

* * * * *